United States Patent [19]

Pasco

[11] Patent Number: 5,053,928
[45] Date of Patent: Oct. 1, 1991

[54] LIGHT GUIDE

[75] Inventor: Ian K. Pasco, Slough, England

[73] Assignee: Techophone Limited, Surrey, England

[21] Appl. No.: 568,256

[22] Filed: Aug. 15, 1990

[30] Foreign Application Priority Data

Aug. 24, 1989 [GB] United Kingdom ............... 8919214

[51] Int. Cl.⁵ .................................... H04M 1/22
[52] U.S. Cl. ........................... 362/24; 362/27; 362/31; 40/546
[58] Field of Search ............ 362/24, 27, 30, 31, 362/88; 40/546; 200/314, DIG. 47

[56] References Cited

U.S. PATENT DOCUMENTS

| | | | |
|---|---|---|---|
| 3,774,021 | 11/1973 | Johnson | 240/2.1 |
| 4,124,879 | 11/1978 | Schoemer | 362/24 X |
| 4,349,705 | 9/1982 | Kuhfus | 200/314 X |
| 4,670,633 | 6/1987 | Kaiwa et al. | 362/24 X |
| 4,937,408 | 6/1990 | Hattori et al. | 200/314 |

FOREIGN PATENT DOCUMENTS

| | | |
|---|---|---|
| 0029638 | 3/1981 | European Pat. Off. . |
| 777861 | 6/1957 | United Kingdom . |
| 2149353 | 6/1985 | United Kingdom . |
| 2185576 | 7/1987 | United Kingdom . |

*Primary Examiner*—Stephen F. Husar
*Attorney, Agent, or Firm*—Perman & Green

[57] ABSTRACT

A light guide for illuminating a keyboard or keypad from behind comprises a transparent grid-like plate having an array of apertures in each of which is accommodated a respective key of the keyboard/keypad. The transparent plate comprises an integral lens aligned with a reflector for directing light from an external source into the plane of the plate. Various plane reflecting surfaces are provided for reflecting the light in a localized path completely surrounding each of the apertures. This arrangement enables the keys to be illuminated with a high degree of uniformity using only relatively few distributed light sources.

14 Claims, 2 Drawing Sheets

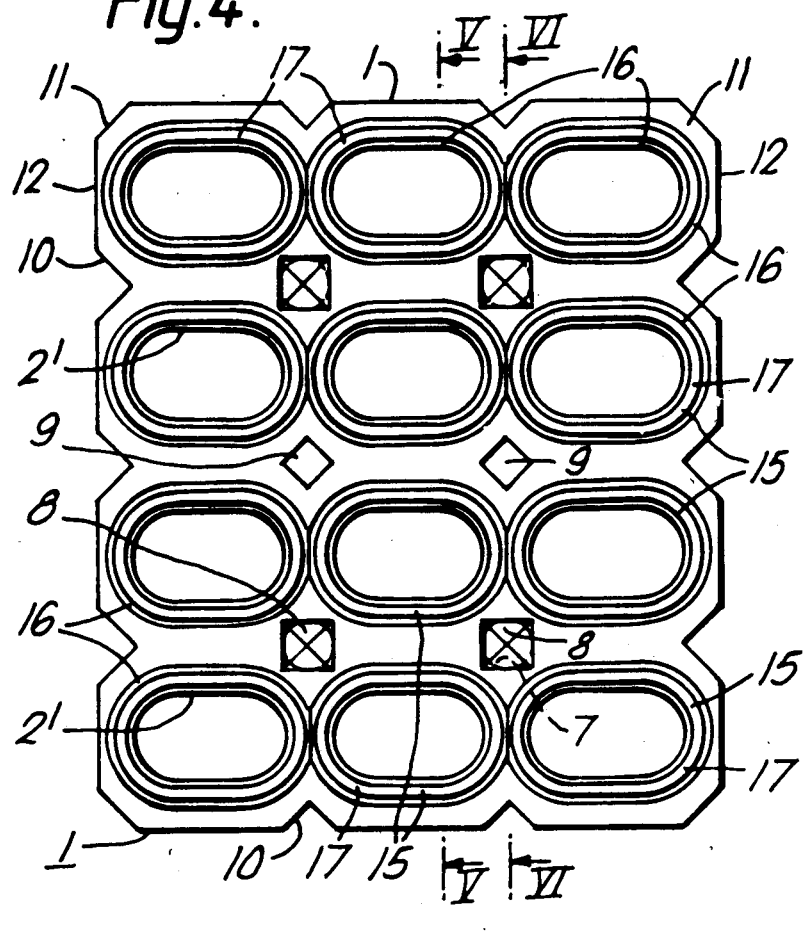

LIGHT GUIDE

This invention relates to a light guide for illuminating an information bearing member particularly, but not exclusively, the keys of a keyboard or keypad.

BACKGROUND OF THE INVENTION

It is known, for example, to illuminate the keypad of a mobile telephone in an automobile to facilitate night-time use. Each individual key may be illuminated by a respective light source located directly behind the key. This arrangement is, however, very expensive since a separate light source is required for each key. Also, without carefully designed diffusers in or behind the keys, unsightly bright spots may be seen through the keys coinciding with the light source.

A more economical approach utilizes fewer distributed light sources and the light is directed towards the keys with the aid of a light guide in the form of a transparent plate. A known light guide comprises an array of apertures above which a respective translucent key may be located. As is conventional, the key may carry a numeric and/or alphabet character, a symbol, a word or an abbreviated message. A portion of the key depends or extends into the aperture so that light can be coupled into the key from the light guide. A first conical indentation feature is present adjacent one surface of the plate at the interstices of a group of four apertures. A light source may be accommodated at least partially in the indentation which is effective to direct light into the plate generally in the direction transverse to the plane of the plate. A second conical indentation is present at the opposite surface of the plate and aligned with the first cone in such manner that the apexes of the two cones confront each other. The second cone is effective to disperse light from the first cone by total internal reflection omnidirectionally into the plane of the plate. Thus some of the light is directed towards the apertures and so illuminates the keys. A drawback with this arrangement is that it tends not to give uniform illumination and the lighting effect deteriorates particularly towards the edges of the keyboard or keypad and generally at locations further away from the light sources.

U.S. Pat. No. 3,774,021 discloses a light guide for illuminating a telephone dial faceplate having twelve apertures using two distributed light sources. In this case a special kind of light source is used which emits light predominantly in a horizontal plane. Therefore these light sources are recessed within the light guide so that the light is coupled directly into the plane of the light guide. The side edges of the light guide are provided with notched re-entrant portions so that light rays incident thereupon tend to be reflected back into the light guide. Hence, the light is both introduced and reflected omnidirectionally within the light guide and it is inevitable that the resulting illumination must lose intensity at points further away from the light sources.

UK Patent GB 2,149,353 discloses an illuminated keypad which does not use a light guide, but instead employs protruding reflectors on the underside of an opaque grid-like key retaining member, which reflect light from distributed light sources directly into the keys. Hence one light source disposed at the interstice of four keys is responsible for introducing light into all four of those keys. However, it has to be noted that the configuration is such that light is injected primarily at the corners of the keys, and secondly along some, but not all, sides of the keys. Although this configuration may go some way to improving uniformity of illumination with distributed light sources, the lighting effect must nevertheless deteriorate to some extent towards the edges of the keyboard and generally at locations further away from the light sources.

Although it relates primarily to the illumination of instrument panels, eg. in automobiles, rather than to keyboards, EP-A-0,029,635 discloses a light guide comprising an integral lens feature which is effective to collimate light from a distributed light source before it is reflected into the plane of the plate for illuminating various translucent areas of an information bearing overlay. In this case the light is reflected omnidirectionally (by internal reflection into the plane of the light guide) by a 45° semi-vertical angle conical recess aligned with the lens but on the opposite face thereof.

SUMMARY OF THE INVENTION

According to the present invention there is provided a light guide for illuminating an information-bearing member, comprising a transparent plate having at least one area associated with the information-bearing member, the plate having means for reflecting light from an external light source into the plane of the plate, characterized in that the reflecting means are arranged for reflecting light in a localized path substantially surrounding the area of the plate associated with the information-bearing member.

In this manner a single key (or other image-bearing member, or indeed a plurality of keys of a keyboard or keypad, may be illuminated with a high degree of uniformity using distributed light sources since the light is evenly and efficiently transmitted around the whole area of the key in a localized manner.

Suitably the light guide also includes lens means formed integrally in the plate for directing light from the external light source towards the reflecting means.

In a preferred embodiment the means for reflecting the light adjacent the lens comprises a prismatic indentation in the plate, specifically in the form of a four-sided pyramid whereby each of the inclined faces of the pyramid serves to reflect the light from the lens in a cruciform beam pattern.

A light guide in accordance with the invention is ideally suited to a situation where the transparent plate has a plurality of areas associated with respective image-bearing members (eg. keys) in respective portions of a unitary information bearing member (eg. a keymat), wherein the reflecting means are arranged for reflecting light in a respective localized path substantially surrounding each of the said areas.

The or each area associated with an information bearing member is suitably an aperture in the plate and the key (or other information bearing member) may extend into the aperture so that light can be coupled readily from the light guide into the key. The walls of the aperture(s) may be inclined to refract light towards the front surface of the aperture and so direct light predominantly towards the front of the key for better illumination.

In a particular embodiment the light guide comprises an array of apertures arranged in rows and columns, and the lens and the reflecting means associated therewith are present at the interstices of a first group of the said apertures so as to direct light between the apertures of the first group in directions substantially parallel to the rows and columns. Further reflecting means, eg. in the form of a side wall or an aperture, may be included at the interstices of a second group of the apertures. The further reflecting means are arranged to direct light between the apertures of the second group in directions substantially parallel to either the columns or the rows.

BRIEF DESCRIPTION OF THE DRAWINGS

Embodiments of the invention will now be described, by way of example, with reference to the accompanying drawing, in which:

FIG. 4 is a plan view of an alternative light guide in accordance with the invention, FIG. 5 is a cross section of the light guide taken on the line V—V in FIG. 4, and FIG. 6 is a cross section of the light guide taken on the line VI—VI in FIG. 4.

In the Figures the same reference numerals are used to designate corresponding parts.

DETAILED DESCRIPTION OF THE INVENTION

The Figures show a part of a keypad assembly in which the individual keys are uniformly illuminated from behind. The assembly comprises a transparent plate-like light guide 1 having a generally rectangular outline. The light guide which suitably is formed by injection molding may be made of acrylic plastics or from any suitable optical quality transparent material including celluloid, nitrocellulose, perspex, acrylonitrite, polysulphones, polystyrene and polycarbonate.

Figure 2:
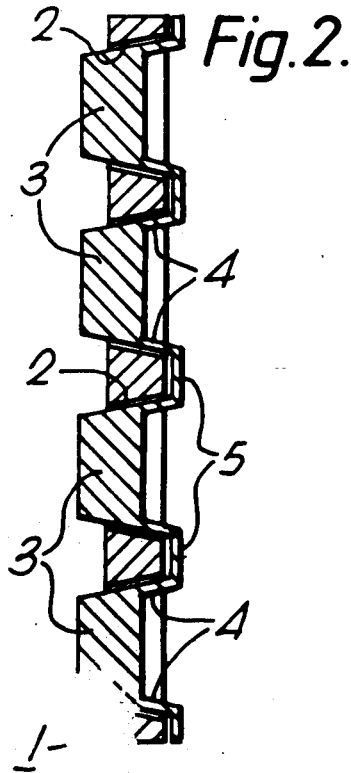
FIG. 2 is a cross section of the keypad assembly taken on the line II—II in FIG. 1.

The light guide 1 has a generally grid-like configuration and comprises a regular array of apertures 2 arranged in four rows and three columns. As shown, the apertures are generally rectangular with rounded corners. Accommodated within each aperture is a correspondingly shaped key 3 bearing an item of information, typically a numeric or alphabet character or other symbol on its front face. In the present case the keys are labelled "1" through "9", "0", * and #, the character being printed in an opaque ink. The keys 3 are suitably made of a translucent elastomeric material and all the keys 3 are formed integrally with a mat-like member 5. The individual keys 3 are joined to the main body of the mat 5 by connecting portions 4. As can be seen in FIG. 2, the front faces of the keys 3 are proud of the apertures 2 in the light guide and the back faces of the keys are located within the aperture between the front and back faces of the light guide so that light can readily be coupled into the key from the light guide.

Light is introduced into the assembly from distributed light sources 6, eg. light emitting diodes mounted adjacent the back face of the light guide. In the present embodiment four light sources 6 are used for uniformly illuminating all twelve of the keys 3.

In the vicinity of each of the light sources 6 the light guide comprises a respective convex lens 7 formed integrally therewith. Each lens 7 serves to collimate the majority of light from its associated light source 6 into a beam travelling traversely to the plane of the light guide.

Aligned with the lens 7, adjacent the front face of the light guide 1, there is provided a prismatic indentation 8 which offers four substantially plane reflecting surfaces each having a triangular outline. The prismatic indentation is thus in the shape of a four-sided pyramid in which the angle between opposite faces at the apex is approximately 90°. The four inclined faces of the pyramidal indent 8 serve to direct the light from the lens 7 into the plane of the light guide by means of total internal reflection. The pyramidal indents 8 are disposed to reflect light in between the apertures 2 in four directions parallel to the rows and columns of the aperture array, as described in more detail below.

One lens 7 and pyramidal reflector 8 is present at the interstices of the four apertures associated with the group of keys labelled "1", "2", "4" and "5" and three further similar lenses 7 and pyramidal reflectors 8 are present at the interstices of the groups of keys labelled "7", "8" * and "0"; "8", "9", "0" and #; "2", "3", "5" and "6" respectively.

A square aperture 9 is provided at the interstices of the keys 3 labelled "4", "5", "7" and "8". The aperture 9 is oriented such that its sides are inclined at 45° with respect to the sides of the apertures 2. A similarly oriented square aperture 9 is present at the interstices of the keys 3 labelled "5", "6", "8", and "9". The walls of the apertures 9 are substantially orthogonal to the plane of the light guide.

At the periphery of the light guide notches 10 are provided between each pair of keys adjacent the outer edge of the light guide. Thus ten notches 10 are provided one between each of the pairs of keys 3 labelled "1" and "2"; "2" and "3"; "3" and "6"; "6" and "9"; "9" and #; # and "0"; "0" and *; * and "7"; "7" and "4"; and "4" and "1". Each notch 10 is triangular shaped. The internal walls of the notch are substantially orthogonal to the plane of the light guide and are inclined at 45° with respect to the sides of the apertures 2.

Each of the corners of what would otherwise be a substantially rectangular light guide 1 are chamfered to provide a face 11 which is substantially orthogonal to the plane of the light guide and inclined at 45° with respect to the sides of the apertures 2.

In operation, light is introduced into and directed around the light guide in the following manner.

Consider the single key 3 labelled "4". Light is introduced into the light guide from a light source 6 by lens 7 and pyramidal reflector 8 located at the interstice between the keys labelled "1", "2", "4", and "5". A first plane reflecting surface of the pyramidal indent 8 directs light from lens 7 by means of total internal reflection through the light guide between keys 3 labelled "4" and "5" substantially parallel to the columns of keys 3 and apertures 2. The light is then incident on the 45°. inclined face of aperture 9 which internally reflects the light between keys 3 labelled "7" and "4" parallel to the rows of keys 3 and apertures 2. The light is then internally reflected by the 45° inclined wall of the triangular notch 10 at the edge of the light guide and is directed between the key 3 labelled "4" and the outer edge of the light guide 1. From there the light is internally reflected by a second notch in the edge of the light guide 1 so that it travels between the keys 3 labelled "4" and "1" back towards the pyramidal reflector 8. Hence the light form the lens 7 has travelled in a localized path (clockwise) round all four sides of the aperture 2 in which the key 3 labelled "4" is localized.

Light also travels in a similar path but in a contrary (anti-clockwise) direction around key 3 labelled "4" in the following manner. The light from the lens 7 is reflected by a second plane reflecting surface adjacent the first surface of the pyramidal indent 8 between keys 3 labelled "1" and "4" towards a first notch 10 in the edge of the light guide and from there between the key 3 labelled "4" and the edge of the light guide toward a second notch 10. From notch 10 the light is reflected towards aperture 9 between keys labelled "4" and "7" and then back towards the pyramidal indent 8 between keys 3 labelled "4" and "5".

It is noted here that the triangular notches 10 and the oriented square apertures 9 are located mid-way between the respective keys so that, on reflection, an incident beam of light is split into two halves travelling in opposite directions at right angles to the incident beam. Thus the aperture 9 between keys labelled "4", "5", "7" and "8" serves to direct light from the pyramidal reflector 8 located between keys labelled "1", "2", "4" and "5" not only between keys labelled "4" and "7" but also between keys labelled "5" and "8". Similarly light from the pyramidal reflector 8 situated between keys labelled "7", "8", "0" and # is reflected by the same aperture 9 between keys labelled "4", "5", "7" and "8" in opposite directions between keys labelled "4" and "7" and between the keys labelled "5" and "8".

In a similar manner light from the other two plane reflecting faces of the same pyramidal reflector 8 located between the keys 3 labelled "1", "2" "4" and "5" directs light in a closed loop path around the keys labelled "2" and "5" respectively.

The chamfered faces 11 at the corners of the light guide similarly cause total internal reflection of light travelling towards the corners of the light guides and so direct light along the two outer sides of the apertures 2 associated with the cornermost keys 3 labelled "1", "3", * and #.

Figure 1:
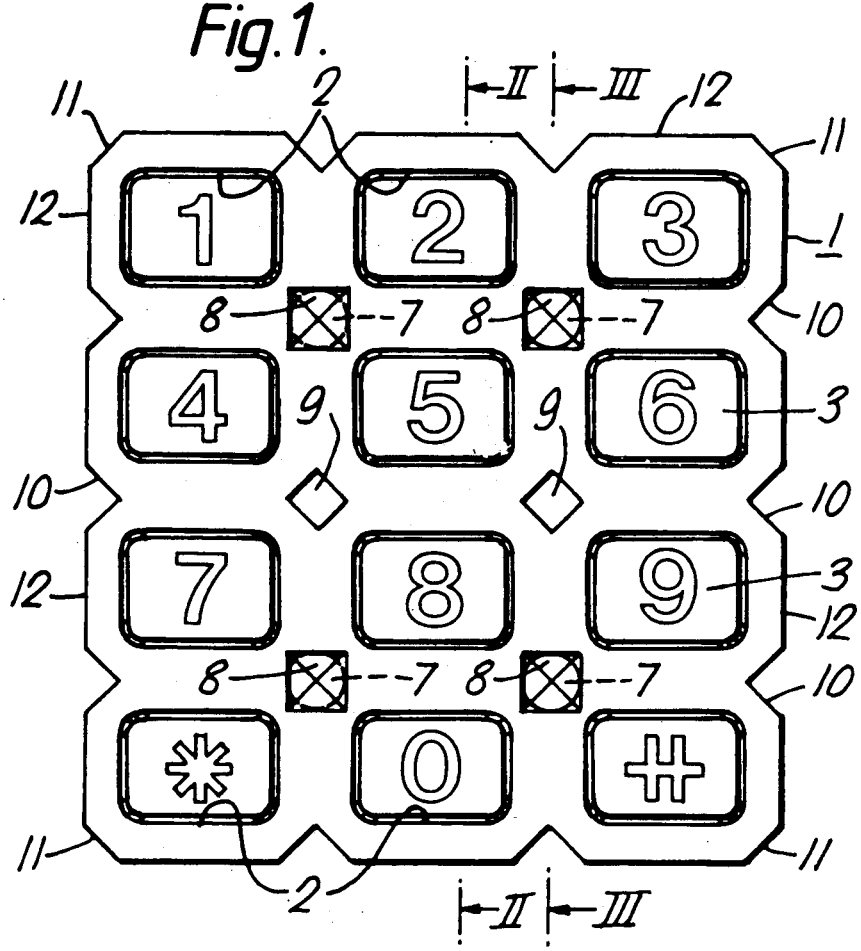
FIG. 1 is a plan view of an illuminated keypad assembly incorporating a light guide in accordance with the invention.

In a similar manner to that already described with reference to the top left hand corner of the light guide as illustrated in FIG. 1, light from the lens 7 and indent 8 between keys labelled "2", "3", "5" and "6" is reflected (in both directions) all the way around each of these keys while light from lens 7 and reflector 8 at the interstice of keys labelled "7", "8", "0" and * is directed (again in both directions) around each of these keys; and light from lens 7 and reflector 8 at the interstices of keys "8", "9", # and "0" is reflected in a closed loop path (in both directions) around each of these keys.

Thus the whole framework of the light guide 1 is filled with light from a relatively small number of distributed light sources 6 (in this case, four) and the light is caused to travel in a grid-like path configuration surrounding each of the keys 3.

The reflectors 8, 9, 10 and 11 are all optically polished for optimum reflection and to ensure that little or no light escapes from the light guide at these surfaces. Additionally the edge faces 12 of the light guide intermediate notches 10 may be coated with a reflective material, eg. a white paint to prevent light escaping therefrom.

As described so far the light has been travelling only in paths parallel to the rows and columns of the array of apertures 2. In a real system this is not the case due to optical imperfections and hence light which is travelling obliquely between adjacent keys 3 is able to escape from the walls of the apertures 2. This light is coupled into the translucent key 3 to illuminate the key 3 from behind. Preferably the walls of the apertures 2 are "greyed" or roughened so that they are optically imperfect. This causes scattering and enables more light to escape from the light guide into the apertures and hence into the keys 3.

As can be seen in FIG. 2, the apertures 2 are tapered towards the front face of the light guide 1. This causes light to be refracted towards the front face of the key 3 as it escapes into the aperture 2 thus enhancing the illumination effect.

The light guide described above provides a remarkably high uniformity of illumination of all the twelve keys 3, even towards the outer edges thereof, using only four distributed light emitting diodes as light sources. In the present embodiment the characters on the keys appear as a dark silhouette against a uniformly illuminated background.

Figure 3:
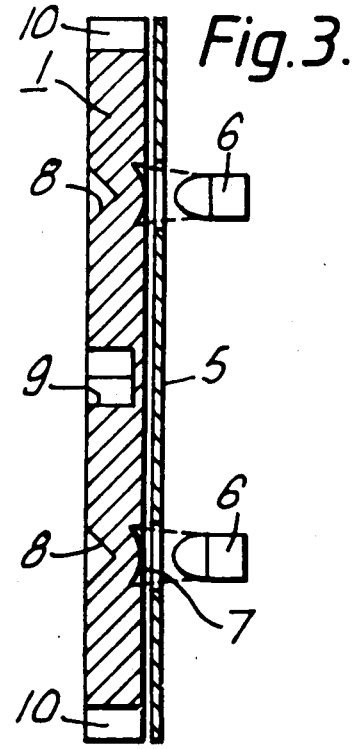
FIG. 3 is a cross section of the keypad assembly taken on the line III—III of FIG. 1.

An alternative embodiment of a light guide in accordance with the invention will now be described with reference to FIGS. 4 to 6. In these Figures only the light guide itself is shown, i.e. the actual keys have been omitted for the sake of clarity. The light guide 1 has a similar general configuration to that described with reference to FIGS. 1 to 3.

In this case, however, the apertures 2' are lozenge-shaped and each aperture 2' is surrounded by an upstanding hoop-like rib 15 formed integrally with the light guide 1. The hoops 15 have chamfered side faces 16 with top faces 17 which are flat and are roughened or greyed so that they are optically imperfect, which causes light to escape, thus providing an illuminated ring around the key. This is particularly useful where keys are used which are predominantly opaque and include a translucent character. In this case the character itself will be illuminated against a dark background and surrounded by a ring of light which helps to highlight the key area for the user. The fact that the hoops 15 are proud of the major part of the light guide facilitates localized roughening, i.e. greying, e.g. by chemical etching or mechanical abrasion, of the top faces 17 of the hoops without affecting adjacent areas of the light guide surface.

In this embodiment the light guide does not itself include a true lens feature, but instead a simple recess 18 is provided in the rear face of the light guide 1 which accommodates the front of the domed lens portion 20 of the LED 6. Alternatively, if space constraints permit, the recess 18 may be omitted altogether and the LED 6 may be disposed in close proximity to, e.g abutting the rear face of the light guide opposite the pyramidal indent 8 on the front face thereof. In this case an LED would be chosen whose light output characteristics (specifically directionality) are such that the majority of the emitted radiation is injected into the light guide 1.

It will be noted from FIG. 6 that the front face of the light guide, in cross-section, has localized convex portions due to the intersection of adjacent hoops 15.

Also, it is noted here that the front (or indeed the rear) face of the light guide need not be flat, but may for example have a camber in the width direction, i.e. transverse to the cross-sections shown in FIGS. 5 and 6. This may be desirable, for example, when the main casing of the equipment into which the light guide is to be incorporated has a complementary contour either for aesthetic or functional reasons. The light guide 1 can thus be accommodated in close fitting relationship to the equipment casing.

In view of the foregoing description it will be evident to a person skilled in the art that various modifications may be made within the scope of the present invention. For example, more or less than twelve apertures and keys may be used as appropriate and the apertures/keys need not be rectangular or lozenge-shaped, but may have any other suitable shape. They may, for example, be circular, oval, or triangular. Similarly, more or less than four distributed light sources may be employed. In addition it is noted that the keys 3 need not be co-joined into a unitary keymat but may be provided as discrete keys in respective apertures.

What is claimed:

1. A light guide for illuminating an information-bearing member, comprising:
a transparent plate having at least one area associated with the information-bearing member, the plate having means for reflecting light from an external light source into the plane of the plate,
wherein the reflecting means comprises first reflecting means for directing light from the light source in a first direction in the plane of the plate, second reflecting means for reflecting light from the first reflecting means in a second direction transverse to said first direction and in the plane of the plate, third reflecting means for reflecting light from the second reflecting means in a third direction transverse to the second direction and substantially parallel but in the opposite sense to the first direction and in the plane of the plate, and fourth reflecting means for reflecting light from the third reflecting means towards said first reflecting means in a fourth direction transverse to said first and third directions and substantially parallel but in the opposite sense to the second direction and in the plane of the plate.

2. A light guide as claimed in claim 1, wherein each of the first, second, third, and fourth reflecting means comprises at least one substantially plane reflecting surface.

3. A light guide as claimed in claim 1, wherein the first reflecting means comprises four substantially plane reflecting surfaces, neighboring surfaces being arranged in contiguous relationship.

4. A light guide as claimed in claim 3, wherein the first reflecting means is in the form of a prismatic indentation in the plate.

5. A light guide a claimed in claim 4, wherein the prismatic indentation is in the form of a four-sided pyramid.

6. A light guide as claimed in claim 1, wherein the second reflecting means comprises a side wall of an aperture or indentation in the plate.

7. A light guide as claimed in claim 1, wherein the plate includes lens means for directing light from the external light source towards the first reflecting means.

8. A light guide as claimed in claim 1, wherein the transparent plate has a plurality of areas associated with respective information-bearing members or respective portions of a unitary information-bearing member, the reflecting means being arranged for reflecting light in a respective localized path substantially surrounding each of the said areas.

9. A light guide as claimed in claim 1, wherein the or each area associated with an information-bearing member is formed by an aperture in the plate.

10. A light guide as claimed in claim 9, wherein the bounding walls of the or each aperture in the plate are adapted to promote the passage of light into the area associated with the image bearing member.

11. A light guide as claimed in claim 9, wherein the or each aperture forming an area associated with an information-bearing member has inclined walls.

12. A light guide as claimed in claim 9, comprising an array of apertures arranged in rows and columns, the first reflecting means being present at the interstices of a first group of the said apertures and arranged to direct light between the apertures of the first group in directions substantially parallel to the rows and columns.

13. A light guide as claimed in claim 12, wherein the second reflecting means are present at the interstices of a second group of the apertures of the array and are arranged to direct light between the apertures of the second group in directions substantially parallel to either the rows or the columns.

14. A keypad assembly comprising a light guide as claimed in claim 9, a plurality of information-bearing keys associated with respective apertures in the plate, and a light source for introducing light into the light guide to illuminate the keys.

* * * * *